(12) United States Patent
Takahashi

(10) Patent No.: US 9,039,290 B2
(45) Date of Patent: May 26, 2015

(54) CAGE AND THRUST ROLLER BEARING INCLUDING CAGE

(71) Applicant: JTEKT CORPORATION, Osaka-shi, Osaka (JP)

(72) Inventor: Ryou Takahashi, Northville, MI (US)

(73) Assignee: JTEKT CORPORATION, Osaka-Shi (JP)

( * ) Notice: Subject to any disclaimer, the term of this patent is extended or adjusted under 35 U.S.C. 154(b) by 0 days.

(21) Appl. No.: 14/154,793

(22) Filed: Jan. 14, 2014

(65) Prior Publication Data
US 2014/0205228 A1    Jul. 24, 2014

(30) Foreign Application Priority Data

Jan. 21, 2013 (JP) ................................ 2013-008396

(51) Int. Cl.
| | |
|---|---|
| *F16C 33/46* | (2006.01) |
| *F16C 33/49* | (2006.01) |
| *F16C 33/50* | (2006.01) |
| *F16C 33/51* | (2006.01) |

(52) U.S. Cl.
CPC ......... *F16C 33/4676* (2013.01); *F16C 33/4682* (2013.01); *F16C 33/49* (2013.01); *F16C 33/50* (2013.01); *F16C 33/51* (2013.01)

(58) Field of Classification Search
CPC ...... F16C 33/4664; F16C 33/49; F16C 33/50; F16C 33/502; F16C 33/513; F16C 33/548
USPC ......... 384/523, 526, 531, 572, 573, 578, 579, 384/614, 618, 621, 623
See application file for complete search history.

(56) References Cited

U.S. PATENT DOCUMENTS

| | | | | |
|---|---|---|---|---|
| 672,648 | A * | 4/1901 | Perry ............................ | 384/623 |
| 820,520 | A * | 5/1906 | Riebe ............................ | 384/526 |
| 2013/0182991 | A1* | 7/2013 | Takahashi ..................... | 384/623 |
| 2013/0287331 | A1* | 10/2013 | Sekido .......................... | 384/623 |

FOREIGN PATENT DOCUMENTS

| | | |
|---|---|---|
| JP | A-2010-65828 | 3/2010 |
| JP | A-2012-47199 | 3/2012 |

* cited by examiner

*Primary Examiner* — James Pilkington
(74) *Attorney, Agent, or Firm* — Oliff PLC

(57) ABSTRACT

A cage, which is annular, and is used in a thrust roller bearing, includes a plurality of cage segments arranged in a circumferential direction. Each of the cage segments includes an arc portion; and a bar portion that extends radially inward from the arc portion and that maintains a circumferential interval between rollers adjacent to each other. A groove portion extending along an axial direction is formed at each of end faces of the arc portions, the end faces facing each other in the circumferential direction. In the cage, elastic bodies are inserted into the groove portions and urge the arc portions in the circumferential direction, each of the elastic bodies is disposed between the end faces facing each other, and the cage segments are connected to each other by the elastic bodies.

20 Claims, 4 Drawing Sheets

CAGE AND THRUST ROLLER BEARING INCLUDING CAGE

INCORPORATION BY REFERENCE

The disclosure of Japanese Patent Application No. 2013-008396 filed on Jan. 21, 2013 including the specification, drawings and abstract, is incorporated herein by reference in its entirety.

BACKGROUND OF THE INVENTION

1. Field of the Invention

The invention relates to a cage used in a thrust roller bearing that supports, for example, a crushing portion of a crusher so that the crushing portion is rotatable, and to a thrust roller bearing including the cage.

2. Description of the Related Art

In a crusher that crushes solids such as rocks or stones, a thrust roller bearing is used. The thrust roller bearing supports an umbrella-shaped crushing portion so that the crushing portion is rotatable. Although a large crushing load is applied to the crushing portion, a full complement roller bearing, whose loading capacity is large, cannot be adopted as the thrust roller bearing that supports the crushing portion, for the following reason. Since the crushing portion rotates at a high speed, if the full complement roller bearing is used, skew occurs.

Thus, a thrust roller bearing as described above includes a cage that maintains each circumferential interval between rollers adjacent to each other. An example of the cage employed is a machined cage made of brass that is integrally constituted by a large-diameter annular portion, a small-diameter annular portion concentric with the large-diameter annular portion, and a plurality of bar portions each of which extends along the radial direction and connects the large-diameter annular portion and the small-diameter annular portion. In the machined cage, each bar portion is interposed between rollers adjacent to each other, so as to maintain the circumferential interval between the rollers.

Further, a pin-type cage 105 as shown in FIG. 4 may be employed. The pin-type cage 105 includes, instead of the above-described bar portions, bar portions (pins) 152 each of which is inserted in a through-hole 104h extending along a rotation central axis 104r of a roller 104, and connects a large-diameter annular portion 151 and a small-diameter annular portion 156. In the pin-type cage 105, each bar portion (pin) 152 inserted through the roller 104 maintains the circumferential interval between the rollers 104. Thus, the pin-type cage 105 is able to retain a large number of rollers 104 between a fixed ring 102 and a rotary ring 103, as compared to the machined cage. As a result, the pin-type cage 105 has an advantage that the loading capacity can be increased.

A large crushing load is unevenly applied to the crushing portion of the crusher described above under a severe vibration environment due to the crushing operation. Therefore, a large load may be locally applied to one or more of the rollers 104 provided in a thrust roller bearing 101 that supports the crushing portion. Thus, the one or more of the rollers 104, to which the large load is applied, roll less easily than the rest of the rollers 104. As a result, the large load in the circumferential direction is applied to the bar portion (pin) 152 that retains each of the one or more of the rollers 104 so that the roller 104 is rotatable, and accordingly, the bar portion (pin) 152 is likely to break. Further, the crushing portion of the crusher is a consumable part and is therefore periodically replaced. When the crushing portion is replaced, an inspection operation and a maintenance operation for the bearing can be performed. It is desirable that components of the bearing can be easily replaced when the inspection operation and the maintenance operation are performed.

SUMMARY OF THE INVENTION

An object of the invention is to provide a cage that makes it possible to prevent early breakage, and to easily perform a maintenance operation, and a thrust roller bearing including the cage.

According to an aspect of the invention, there is provided a cage that is annular, and is used in a thrust roller bearing, the cage including a plurality of cage segments arranged in a circumferential direction, wherein each of the cage segments includes an arc portion; and a bar portion that extends radially inward from the arc portion and that maintains a circumferential interval between rollers adjacent to each other, wherein a groove portion extending along an axial direction is formed at each of end faces of the arc portions, the end faces facing each other in the circumferential direction, and wherein elastic bodies are inserted into the groove portions and urge the arc portions in the circumferential direction, each of the elastic bodies is disposed between the end faces facing each other, and the cage segments are connected to each other by the elastic bodies.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
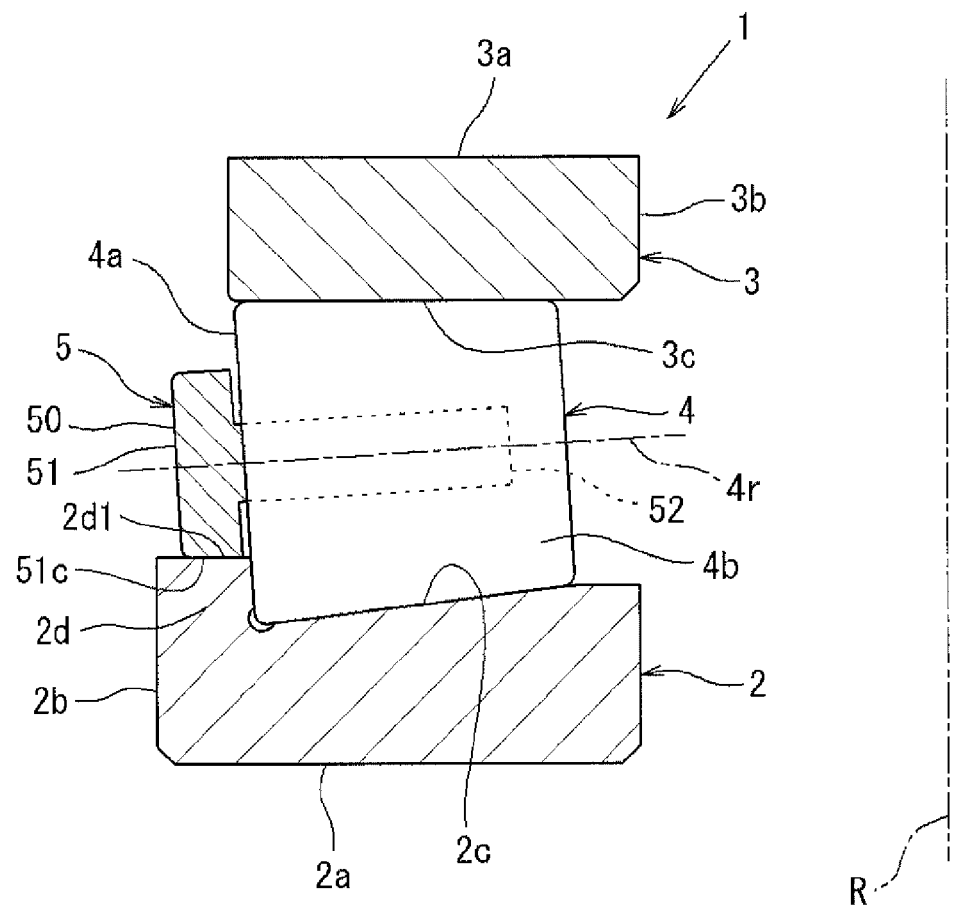
FIG. 1 is an illustrative sectional view of a thrust bearing according to an embodiment of the invention.
Figure 2:
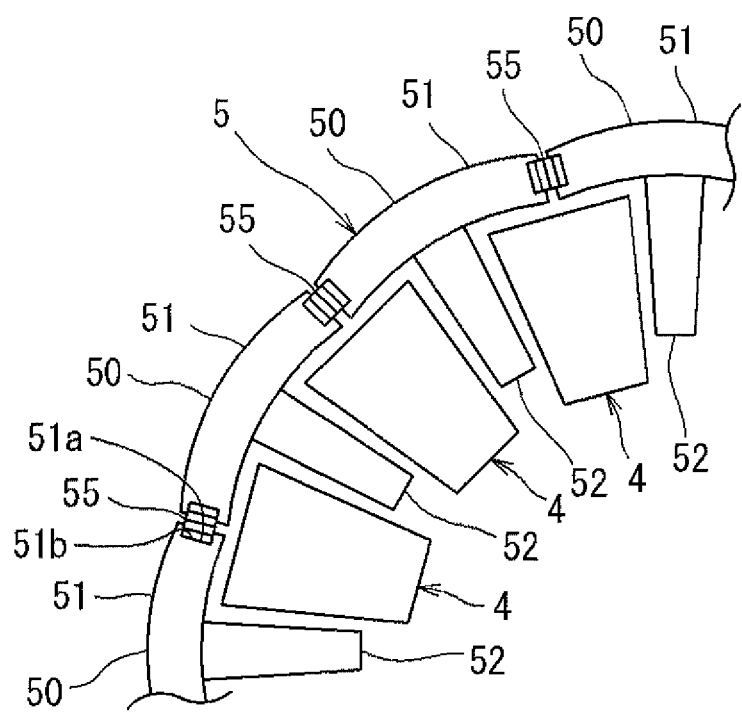
FIG. 2 is an illustrative plan view showing a cage and some of a plurality of tapered rollers according to the embodiment of the invention.
Figure 3A:
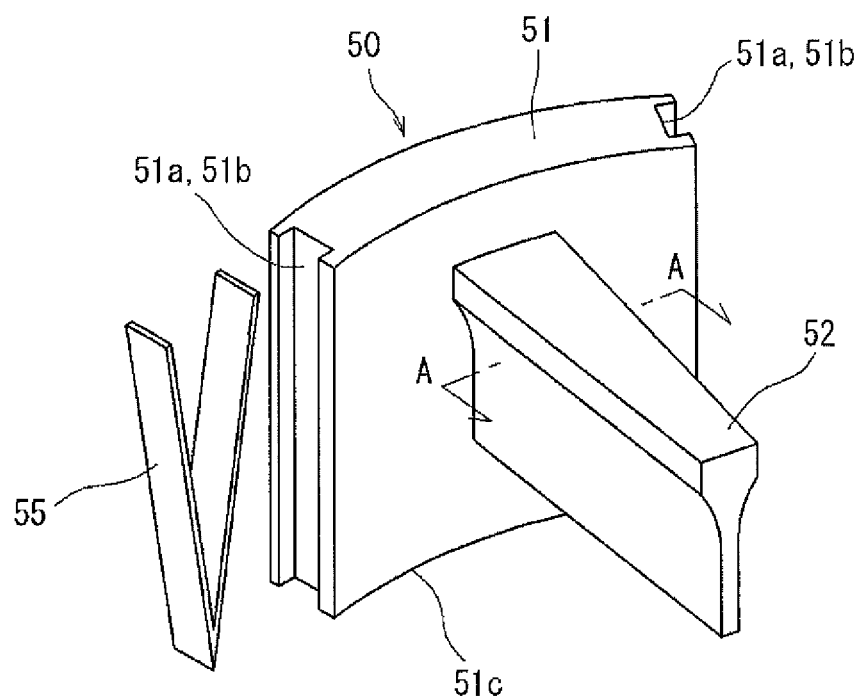
FIGS. 3A and 3B are illustrative views each of which shows a cage segment and a leaf spring that constitute the cage.
Figure 3B:
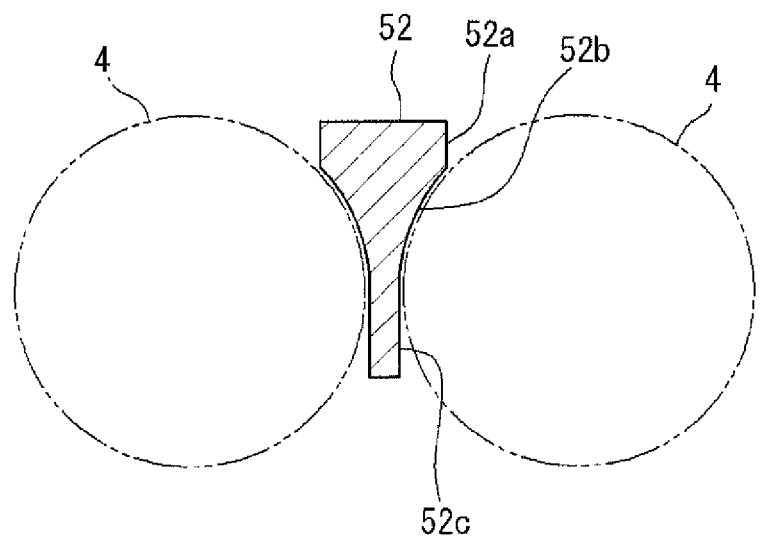
Figure 4:
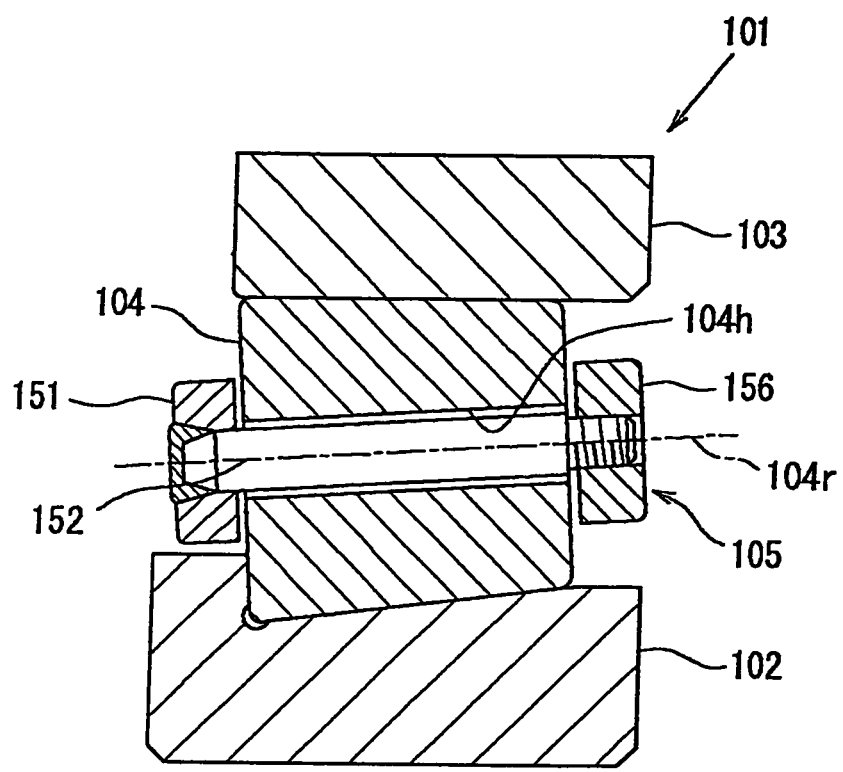
FIG. 4 is an end view of a conventional thrust bearing.

Next, embodiments of the invention will be described with reference to the accompanying drawings. FIG. 1 is an illustrative sectional view of a thrust bearing 1 according to an embodiment of the invention. FIG. 2 is an illustrative plan view showing some of a plurality of tapered rollers 4 and a cage 5 according to the embodiment of the invention. FIG. 3A is an illustrative perspective view of a cage segment 50 and a leaf spring 55 that constitute the cage 5. FIG. 3B is an enlarged end face view taken along a line A-A in FIG. 3A.

The thrust bearing 1 is, for example, a tapered roller thrust bearing 1 that supports a main shaft of a crusher (crusher mill device) so that the main shaft is rotatable, the main shaft of the crusher being an umbrella-shaped crushing portion (shaft body) that rotates about a perpendicular axis R while oscillating. The thrust bearing 1, as shown in FIG. 1, is constituted by a fixed ring 2 (housing washer) and a rotary ring 3 (shaft washer) that face each other, the tapered rollers 4 and the cage 5. The tapered rollers 4 are a plurality of rolling elements that is rollably disposed between the fixed ring 2 and the rotary ring 3. The cage 5 retains the tapered rollers 4 spaced apart from each other at predetermined intervals.

The fixed ring 2 is formed in an annular shape, and is disposed at a lower side in the thrust bearing 1. An outer peripheral surface 2b of the fixed ring 2 is fitted to a housing (not shown), and a lower surface 2a thereof is in contact with a step portion of the housing. In an upper surface of the fixed ring 2, there is formed a fixed-side rolling contact surface 2c which is constituted by an annular surface, and on which the tapered rollers 4 roll. The fixed-side rolling contact surface 2c is an inclined surface that is inclined downward toward a radially outer side (the left side in FIG. 1). An annular rib portion 2d is formed at a radially outer side portion of the fixed-side rolling contact surface 2c. A large-diameter-side end face 4a of each tapered roller 4 slides on the rib portion 2d so that a load acting in the direction of a rotation central axis 4r of each tapered roller 4 is received.

The rotary ring 3 is formed in an annular shape, and has substantially the same diameter as that of the fixed ring 2. The rotary ring 3 is disposed at an upper side in the thrust bearing 1 so as to be concentric with the fixed ring 2. An inner peripheral surface 3b of the rotary ring 3 is fitted to the crushing portion (not shown), and an upper surface 3a thereof is in contact with a step portion of the crushing portion. In a lower surface of the rotary ring 3, there is formed a rotary-side rolling contact surface 3c which is constituted by an annular horizontal surface, and on which the tapered rollers 4 roll. The rotary-side rolling contact surface 3c and the fixed-side rolling contact surface 2c face each other in the axial direction.

Each tapered roller 4 is solid, and has a trapezoidal shape in a section taken along the axial direction, and is disposed so that a small-diameter side of the tapered roller 4 is located at a radially inner side of the thrust bearing 1 (the right side in FIG. 1) and a large-diameter side of the tapered roller 4 is located at a radially outer side of the thrust bearing 1 (the left side in FIG. 1). The tapered rollers 4 are disposed so that the axis of each tapered roller 4 extends in the radial direction of the thrust bearing 1 when seen in a plan view after the tapered rollers 4 are disposed between the fixed ring 2 and the rotary ring 3. The tapered rollers 4 are disposed at equal intervals in the circumferential direction of the thrust bearing 1.

As shown in FIG. 2, the cage 5 has an annular shape, and is constituted by a plurality of cage segments 50 arranged in the circumferential direction. Each cage segment 50 has a cantilever structure that is constituted by an arc portion 51 and a bar portion 52. The bar portion 52 extends radially inward from the arc portion 51, and maintains the circumferential interval between the tapered rollers 4 adjacent to each other.

Each cage segment 50 has only one bar portion 52. Each cage segment 50 is an integrally molded component made of a synthetic resin. Each cage segment 50 is produced by injection molding.

As shown in FIG. 3A, the arc portion 51 is formed in an arc shape in a plan view and has a certain height in the axial direction. The arc portion 51 is formed so as to have a diameter that is substantially the same as, or slightly smaller than that of the rib portion 2d of the fixed ring 2. A recessed groove portion 5ib extending along the axial direction is formed at each of end faces 51a of each arc portion 51 in the circumferential direction, that is, each of the end faces 51a that face each other in the circumferential direction when the cage segments 50 are arranged in the circumferential direction. The arc portion 51 is formed so that when the cage segment 50 is disposed in the thrust bearing 1, a lower surface 51c of the arc portion 51 contacts an upper surface 2d1 of the rib portion 2d (see FIG. 1).

The bar portion 52 is formed so as to separate the adjacent tapered rollers 4 from each other. The bar portion 52 extends radially inward from a circumferential central portion of an inner peripheral side of the arc portion 51, and is formed so that the width of the bar portion 52 in the circumferential direction gradually decreases toward the radially inner side. As shown in FIG. 3B, the bar portion 52 is formed to have a substantially T cross-sectional shape such that the bar portion 52 can be interposed between the adjacent tapered rollers 4 while resting on mutually facing portions of the tapered rollers 4. Specifically, in a cross section of the bar portion 52, an upper portion 52a has flat surfaces and an intermediate portion 52b has a shape that substantially conforms to the outer peripheral surfaces 4b of the adjacent tapered rollers 4. A lower portion 52c of the bar portion 52 has a circumferential width that is smaller than a minimum width of a clearance between the adjacent tapered rollers 4, and has a quadrangular shape that is elongated in the axial direction. The cage 5 also includes leaf springs 55 made of a metal. The leaf springs 55 formed in a V shape can be inserted into the groove portions 51b.

The cage segments 50 are arranged along the annular rib portion 2d of the fixed ring 2. The leaf springs 55 are inserted into the groove portions 51b. Each of the leaf springs 55 is located between the end faces 51a of the arc portions 51, the end faces 51a facing each other. The leaf springs 55 urge the arc portions 51 in the circumferential direction, and thus, the cage segments 50 are connected to each other. When the thrust bearing 1 is used, the lower surfaces 51c of the arc portions 51 slidingly contact the upper surface 2d1 of the rib portion 2d, and thus, the cage segments 50 are supported by the rib portion 2d.

In the cage 5 according to this embodiment, each of the leaf springs 55 is disposed between the end faces 51a of the arc portions 51. The leaf springs 55 are inserted in the groove portions 51b and urge the arc portions 51 in the circumferential direction, and the cage segments 50 are connected to each other by the leaf springs 55. With this configuration, even if a large load is applied from the tapered roller(s) 4 to one or more of the bar portions 52 in the circumferential direction, the load applied to the bar portion(s) 52 can be received by the leaf spring(s) 55 provided between the end faces 51a of the arc portions 51, the end faces 51a facing each other in the circumferential direction. Therefore, breakage of bar portions 52 can be suppressed. Therefore, early breakage of the cage 5 can be prevented. In addition, since the cage segments 50 are connected to each other by the leaf springs 55, if the cage 5 breaks, it is possible to easily replace only the cage segment 50 at the site of breakage. Therefore, a maintenance operation can be easily performed.

Further, due to the urging force of the leaf springs 55 in the circumferential direction, the cage segments 50 can be prevented from being separated from each other. In addition, even in the case where the arc portion 51 of the cage segment 50 has a dimensional variation, the dimensional variation can be adjusted by the leaf spring 55. Further, since the size of the cage segment 50 is smaller than the size of an integrated type cage, the cost of a forming mold and the like can be reduced.

Further, since each cage segment 50 includes only one bar portion 52, one leaf spring 55 directly receives only the load applied to one bar portion 52 in the circumference direction. Therefore, breakage of the bar portions 52 can be suppressed most effectively, as compared to a case where each cage segment includes a plurality of bar portions 52. Therefore, early breakage of the cage 5 can reliably be prevented.

Each cage segment 50 has a cantilever structure constituted by the arc portion 51 and the bar portion 52. Therefore, the number of rollers can be increased and accordingly the loading capacity of the thrust bearing 1 can be increased, as compared to a case where a cage segment has a both-sides supported structure that includes a second arc portion provided radially inside the bar portion 52, in addition to the arc portion 51 and the bar portion 52. Further, it is possible to avoid a situation where a radially inner side portion of the bar portion 52 is so narrow that it is difficult to perform the molding process.

The bar portion 52 is disposed between the tapered rollers 4 adjacent to each other, and the arc portion 51 is formed so as to be supported by the annular rib portion 2d that is formed at the radially outer side portion of the fixed ring 2. Therefore, the load of the cage segment 50 is applied not only to the adjacent tapered rollers 4, but also to the rib portion 2d of the fixed ring 2, and thus, the load of the cage segment 50 applied to the tapered rollers 4 can be reduced. As a result, the lubricating oil covering the outer peripheral surfaces 4b of the tapered rollers 4 can be restrained from being swept by the bar portions 52 of the cage segments 50, and therefore the lubricating oil allows the tapered rollers 4 to smoothly roll.

Each cage segment 50 is an integrally molded component made of a synthetic resin. Therefore, the cage segment 50 can be easily produced by injection molding. Further, the weight of the cage segment 50 can be reduced, as compared to the cage segment 50 made of a metal such as brass.

Further, the bar portion 52 is formed to have a substantially T cross-sectional shape. Therefore, at the time of assembly of the cage 5 or at the time of replacement, each cage segment 50 can be easily disposed by inserting the bar portion 52 from above into the clearance between the adjacent tapered rollers 4. Further, since each tapered roller 4 is solid, the production cost can be reduced, as compared to a roller that has a through-hole.

The cage according to the invention is not limited to the foregoing embodiment. For example, each of the cage segments that constitute the cage may have a both-sides supported structure constituted by a large-diameter arc portion, a small-diameter arc portion, and a bar portion that connects the small-diameter arc portion and the large-diameter arc portion. Further, the cage may have a configuration in which each tapered roller 4 has a through-hole that extends through the rotation center thereof and in which each cage segment includes a large-diameter arc portion and a small-diameter arc portion, and also includes, instead of the bar portion 52, a pin that is inserted through the through-hole and that is fixed to the large-diameter arc portion and to the small-diameter arc portion.

According to the invention, it is possible to provide the cage that makes it possible to prevent early breakage and to easily perform the maintenance operation, and the thrust roller bearing including the cage.

What is claimed is:

1. A cage that is annular, and is used in a thrust roller bearing, comprising
   a plurality of cage segments arranged in a circumferential direction,
   wherein each of the cage segments includes:
     an arc portion with circumferential ends; and
     a bar portion that extends radially inward from the arc portion and that maintains a circumferential interval between rollers that are adjacent to each other,
   wherein a groove portion extending along an axial direction is formed at the circumferential ends of the arc portions, and
   wherein elastic bodies are inserted into the groove portions and urge the arc portions in the circumferential direction, each of the elastic bodies is disposed between the circumferential ends facing each other, and the cage segments are connected to each other by the elastic bodies.

2. The cage according to claim 1, wherein each of the cage segments includes only one of the bar portion.

3. The cage according to claim 2, wherein the arc portion and the bar portion form a cantilever structure.

4. The cage according to claim 3, wherein the arc portion is formed so as to be supported by an annular rib portion that is formed at a radially outer side portion of a fixed ring.

5. The cage according to claim 3, wherein each of the cage segments is an integrally molded component made of a synthetic resin.

6. The cage according to claim 2, wherein the arc portion is formed so as to be supported by an annular rib portion that is formed at a radially outer side portion of a fixed ring.

7. The cage according to claim 6, wherein each of the cage segments is an integrally molded component made of a synthetic resin.

8. The cage according to claim 2, wherein each of the cage segments is an integrally molded component made of a synthetic resin.

9. The cage according to claim 1, wherein the arc portion and the bar portion form a cantilever structure.

10. The cage according to claim 9, wherein the arc portion is formed so as to be supported by an annular rib portion that is formed at a radially outer side portion of a fixed ring.

11. The cage according to claim 9, wherein each of the cage segments is an integrally molded component made of a synthetic resin.

12. The cage according to claim 1, wherein the arc portion is formed so as to be supported by an annular rib portion that is formed at a radially outer side portion of a fixed ring.

13. The cage according to claim 12, wherein each of the cage segments is an integrally molded component made of a synthetic resin.

14. The cage according to claim 1, wherein each of the cage segments is an integrally molded component made of a synthetic resin.

15. A thrust roller bearing comprising:
   a cage according to claim 1;
   a fixed ring that has an annular fixed-side rolling contact surface, and an annular rib portion formed at a radially outer side portion of the fixed-side rolling contact surface;
   a rotary ring that has an annular rotary-side rolling contact surface that faces the fixed-side rolling contact surface in an axial direction, the rotary ring being rotatable relative to the fixed ring; and
   a plurality of rollers that is rollably disposed between the fixed-side rolling contact surface and the rotary-side rolling contact surface, the rollers being kept in position by the annular rib portion.

16. A thrust roller bearing comprising:
   a cage according to claim 2;
   a fixed ring that has an annular fixed-side rolling contact surface, and an annular rib portion formed at a radially outer side portion of the fixed-side rolling contact surface;
   a rotary ring that has an annular rotary-side rolling contact surface that faces the fixed-side rolling contact surface in an axial direction, the rotary ring being rotatable relative to the fixed ring; and
   a plurality of rollers that is rollably disposed between the fixed-side rolling contact surface and the rotary-side rolling contact surface, the rollers being kept in position by the annular rib portion.

17. A thrust roller bearing comprising:
a cage according to claim 9;
a fixed ring that has an annular fixed-side rolling contact surface, and an annular rib portion formed at a radially outer side portion of the fixed-side rolling contact surface;
a rotary ring that has an annular rotary-side rolling contact surface that faces the fixed-side rolling contact surface in an axial direction, the rotary ring being rotatable relative to the fixed ring; and
a plurality of rollers that is rollably disposed between the fixed-side rolling contact surface and the rotary-side rolling contact surface, the rollers being kept in position by the annular rib portion.

18. A thrust roller bearing comprising:
a cage according to claim 3;
a fixed ring that has an annular fixed-side rolling contact surface, and an annular rib portion formed at a radially outer side portion of the fixed-side rolling contact surface;
a rotary ring that has an annular rotary-side rolling contact surface that faces the fixed-side rolling contact surface in an axial direction, the rotary ring being rotatable relative to the fixed ring; and
a plurality of rollers that is rollably disposed between the fixed-side rolling contact surface and the rotary-side rolling contact surface, the rollers being kept in position by the annular rib portion.

19. A thrust roller bearing comprising:
a cage according to claim 12;
the fixed ring has an annular fixed-side rolling contact surface, and an annular rib portion formed at a radially outer side portion of the fixed-side rolling contact surface;
a rotary ring that has an annular rotary-side rolling contact surface that faces the fixed-side rolling contact surface in an axial direction, the rotary ring being rotatable relative to the fixed ring; and
a plurality of rollers that is rollably disposed between the fixed-side rolling contact surface and the rotary-side rolling contact surface, the rollers being kept in position by the annular rib portion.

20. A thrust roller bearing comprising:
a cage according to claim 6;
the fixed ring has an annular fixed-side rolling contact surface, and an annular rib portion formed at a radially outer side portion of the fixed-side rolling contact surface;
a rotary ring that has an annular rotary-side rolling contact surface that faces the fixed-side rolling contact surface in an axial direction, the rotary ring being rotatable relative to the fixed ring; and
a plurality of rollers that is rollably disposed between the fixed-side rolling contact surface and the rotary-side rolling contact surface, the rollers being kept in position by the annular rib portion.

\* \* \* \* \*